(12) United States Patent
Bell et al.

(10) Patent No.: US 7,912,498 B2
(45) Date of Patent: Mar. 22, 2011

(54) ADAPTIVE BUFFERING TO REDUCE AUDIO TRUNCATION

(75) Inventors: Paul G. Bell, Cary, IL (US); Robert J. Armstrong, Chicago, IL (US); George R. Economy, Arlington Heights, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 964 days.

(21) Appl. No.: 11/682,559

(22) Filed: Mar. 6, 2007

(65) Prior Publication Data

US 2007/0232295 A1 Oct. 4, 2007

Related U.S. Application Data

(60) Provisional application No. 60/787,980, filed on Mar. 31, 2006.

(51) Int. Cl.
*H04M 1/00* (2006.01)
(52) U.S. Cl. .................... 455/553.1; 455/445; 455/426.1
(58) Field of Classification Search .......................... None
See application file for complete search history.

(56) References Cited

U.S. PATENT DOCUMENTS

| 5,678,193 | A | 10/1997 | Helm |
| 6,925,175 | B2 * | 8/2005 | Tegethoff ................. 379/406.01 |
| 7,020,491 | B2 | 3/2006 | Kobayashi |
| 2003/0148779 | A1 | 8/2003 | Aravamudan |
| 2005/0070320 | A1 * | 3/2005 | Dent ............................. 455/516 |
| 2006/0046697 | A1 * | 3/2006 | Koren et al. ............... 455/412.2 |
| 2007/0195735 | A1 * | 8/2007 | Rosen et al. ................. 370/335 |

* cited by examiner

*Primary Examiner* — Erika A Gary
(74) *Attorney, Agent, or Firm* — Terri S. Hughes; Valerie M. Davis

(57) ABSTRACT

A method and apparatus are provided for reducing truncation of time sensitive information such as audio in a trunked radio system having a plurality of zone controllers. The method includes the steps of receiving a call request from a calling radio or wireline console by a controlling zone controller of the plurality of zone controllers and measuring a time necessary to set up a call connection between the controlling zone controller and a plurality of called radios or wireline consoles where the call connections of the plurality of called radios or wireline consoles are each set up through a different participating zone controller of the plurality of zone controllers. The method also includes the steps of determining a largest relative measured time among the measured times and buffering audio information from the calling radio for a time period proportional to the determined largest relative time.

19 Claims, 4 Drawing Sheets

ADAPTIVE BUFFERING TO REDUCE AUDIO TRUNCATION

FIELD OF THE INVENTION

The field of the invention relates to communication systems and more particularly to trunked communication systems.

BACKGROUND

Trunked communication systems are generally known. Such systems are typically used as a primary mode of communication by organizations where only short messages are exchanged (e.g., police, firemen, sewer workers, servicemen, etc.).

Trunked radios are typically operated under a half duplex format. Under a half duplex format one radio channel is used to transmit and another radio channel is used to receive messages.

A number of radio channel sites are often organized into a zone. Calls within zones are controlled by a zone controller.

Radios used in trunked systems are typically associated with talk groups, but may also support private calls. A talk group may be any discrete group of users within a certain geographic area or areas.

Messages between members of a talk group may be accomplished by a user simply activating a microphone button and speaking into the microphone. Upon activation of the microphone button, the radio transmits a radio identifier and talk group identifier to a zone controller. The zone controller identifies the talk group, locates other members of the talk group and assigns an IP multicast group for the receivers to join. Once the receivers are joined to the multicast group that is assigned to the talk group, the network duplicates and distributes the audio to the other members of the talk group as the user begins speaking. Typically this is accomplished by allocating a repeater in each service coverage area in support of the transmission.

While trunking systems work relatively well, they are adversely affected by long link delays while operating over multiple zones. Zones are typically connected together via various transport types (e.g., T1s, E1s, Ethernet links, etc). Because of the varying transport types and geographic distances, the audio distribution experiences varying delay characteristics. Where multiple zones are involved, the channel setup time may be too long and audio information may be lost. Accordingly, a need exists for a means and apparatus for setting up trunked calls across multiple zones in the context of varying link delay characteristics.

DETAILED DESCRIPTION

In large (e.g., nationwide) trunking systems that use multicast IP and a sparse mode multicast routing protocol, communication among radio communication devices (radios) is dependent upon the set up and use of a rendezvous point with a multicast tree. However, because of delays in information distribution, a radio may begin to send time critical information (e.g., data, audio, video, etc.) on the network to other radios before the JOIN messages from the other radios have been used to complete the multicast tree. In this case, at least some of the initial packets (e.g., audio packets) may be dropped by the network under an effect referred to as audio truncation.

Figure 1:
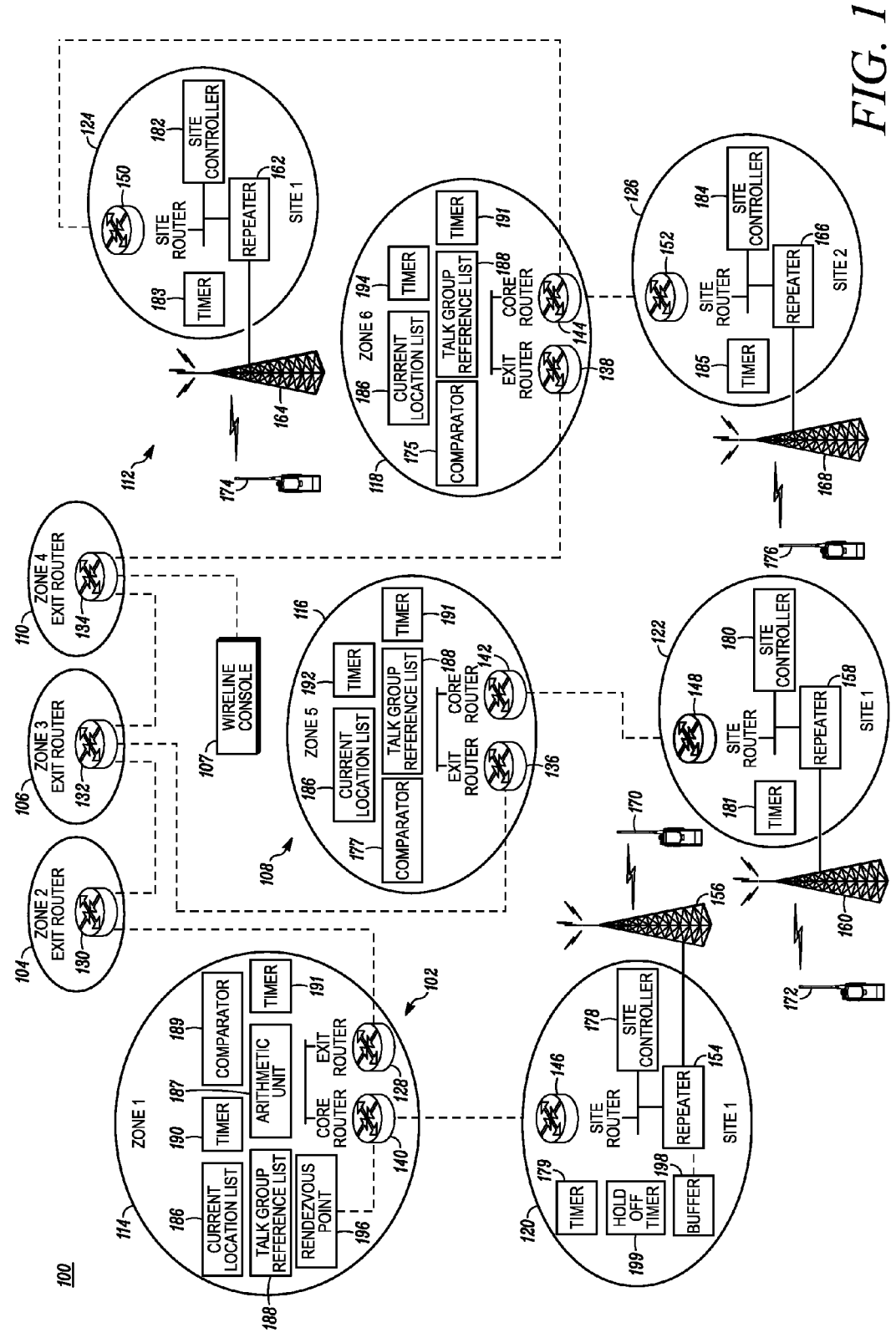
FIG. 1 is a block diagram of a system that reduces audio truncation in accordance with an illustrated embodiment of the invention.

FIG. 1 shows a trunked radio communication system 100 that addresses this problem under illustrated embodiments of the invention. The system 100 uses a method of reducing truncation of time critical information that includes the steps of receiving a call request from a calling radio by a controlling zone controller of the plurality of zone controllers and measuring a time necessary to set up a call connection between the controlling zone controller and a plurality of called radios and/or wireline consoles where the call connections of the plurality of called radios and/or wireline consoles are each set up through a different respective participating zone controller of the plurality of zone controllers. The method further includes the steps of determining a largest relative measured time among the measured times and buffering audio information from the calling radio for a time period equal to the determined largest relative time.

As shown, the system 100 of FIG. 1 includes six zones 102, 104, 106, 108, 110, 112. As would be well known, the system 100 may include any number of zones 102, 104, 106, 108, 110, 112 and/or wireline consoles 107. Each zone 102, 104, 106, 108, 110, 112 may be assumed to include a zone (call) controller 114, 116, 118 and at least one base site 120, 122, 124, 126.

The zones 102, 104, 106, 108, 110, 112 may mutually communicate under an Internet Protocol (IP) using exit routers 128, 130, 132, 134, 136, 138. Communication within any one zone 102, 104, 106, 108, 110, 112 may occur through a core router 140, 142, 144 that routes packets between the exit routers 102, 104, 106, 108, 110, 112 and one or more site routers 146, 148, 150, 152. While operating under an Internet Protocol, the routers 102, 104, 106, 108, 110, 112, 128, 130, 132, 134, 136, 138, 146, 148, 150, 152 are not part of the Internet.

Located at each base site 120, 122, 124, 126 is a site controller 178, 180, 182, 184, a repeater 154, 158, 162, 166 and an associated antenna 156, 160, 164, 168. It should be understood that while only a single repeater 154, 158, 162, 166 is shown at each base site 120, 122, 124, 126 any number of repeaters 154, 158, 162, 166 may be provided to service calls through any particular base site 120, 122, 124, 126.

It should also be understood that the base site controllers 178, 180, 182, 184 and repeaters 154, 158, 162, 166 also operate under an Internet Protocol on both a control and audio plane. The base site controllers 178, 180, 182, 184 operate on a control plane to control allocation of resources through the repeaters 154, 158, 162, 166. The repeaters 154, 158, 162, 166 receive instructions on the control plane and exchange audio information between radios and other parties on the audio plane.

On the control plane, the repeaters 154, 158, 162, 166 are able to transceive channel requests and grants with radios over an air interface. The repeaters 154, 158, 162, 166 also reformat the requests and grants between the format of the air interface and the IP format for exchange with the site controllers 178, 180, 182, 184 and associated zone controller through the site and core routers. The repeaters 154, 158, 162, 166 are similarly able to operate in the audio plane to transceive audio information between the format of the air interface and the wireline IP format.

Operating within the system 100 may be a number of radios 170, 172, 174, 176. At least some of the radios (e.g., 170, 172, 174) may be part of a first talk group.

Within the system 100, members of a particular talk group 170, 172, 174 may be associated with a controlling zone controller that controls communication between that talk group. For example, the first zone controller 114 may be the controlling zone controller for the first talk group 170, 172, 174.

During use (or upon activation), the radios 170, 172, 174, 176 may search for a control channel of a nearby base site 120, 122, 124, 126. Upon finding a control channel, the radios 170, 172, 174, 176 may transmit a registration message registering their presence with the base site 120, 122, 124, 126. The registration message may include an identifier of the radio and/or an identifier of the talk group with which the radio is associated.

The site controller 178, 180, 182, 184 may detect the registration message through the radio interface of the repeater 154, 158, 162, 166 and transfer the request to the associated zone controller 114, 116, 118. The zone controller 114, 116, 118, by reference to a talk group reference list 188 within a memory, may identify a controlling zone controller for the registering radio. In response, the associated zone controller may send a registration message to the controlling zone controller identifying the radio and the radio's presence within a service coverage area of the associated zone controller.

The controlling zone controller may receive the registration message and save a current location of the registering radio in a current location list 186. Other radios of the same talk group may register their location in a similar manner either through an associated zone controller or directly through the controlling zone controller.

Figure 2:
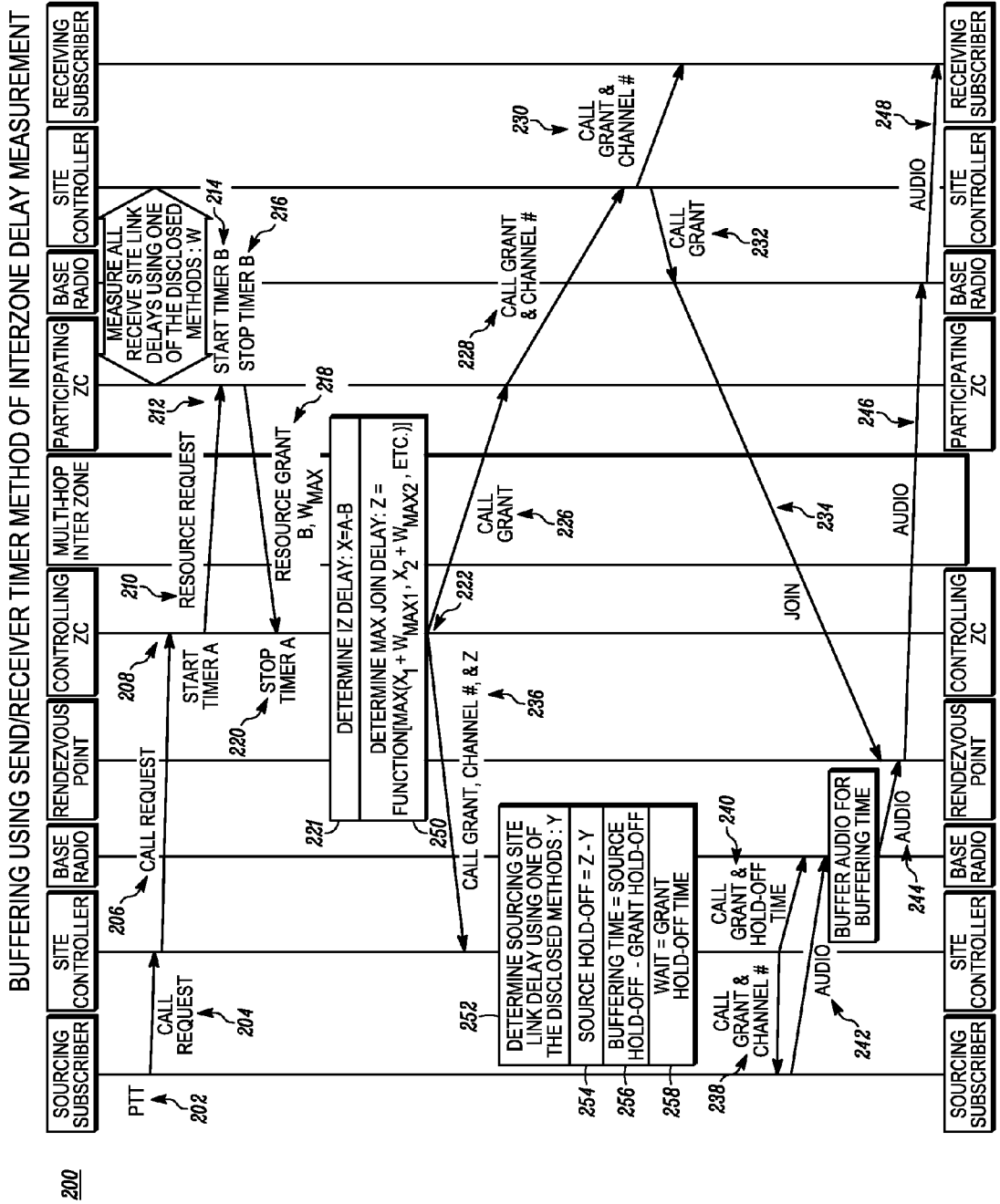
FIG. 2 is a signal flow chart that may be used by the system of FIG. 1.

Upon occasion, a member of the first talk group (e.g., radio 170) may wish to communicate with other members of the first talk group. FIG. 2 is a flow chart 200 that depicts the steps involved in the set up of a communication channel among the members of the first talk group.

To communicate with the other members of the first talk group, a user of the radio 170 may activate 202 a push-to-talk (PTT) button on his radio 170 and begin speaking. In response, the radio 170 may transfer 204 a call request through a control channel to the site controller 178 within the nearest base site 120. The base site controller 178, in turn, may transfer 206 the call request to controlling zone 114.

Upon receipt of the access request, the zone controller 114 first verifies, by reference to the talk group list 188, that it is the controlling zone controller. If the zone controller 114 had not been the controlling zone controller, then the zone controller 114 (by reference to the talk group list 188) would have identified the controlling zone controller and transferred the access request to the controlling zone controller in the manner described above for registration requests.

Once the zone controller 114 has verified that it is, in fact, the controlling zone controller, the zone controller 114 may identify the other members of the first talk group 172, 174 and their locations from the current location list 186. The members of the talk group 170, 172, 174 may be located at the site 120 of controlling zone controller or at the sites 122, 124 of a participating zone controller 116, 118. As used herein, a participating zone controller is a zone controller other than the controlling zone controller through which either a calling or called party has registered. In the current example, only called parties 172, 174 have registered through participating sites 116, 118.

In order to set up a call connection, the controlling zone controller 114 may send a resource request 210 from the controlling zone controller 114 to each participating zone controller 116, 118. At the same time the controlling zone controller 114 may activate 208 a timer A 190 for each participating zone 116, 118.

Timer A may be used to measure the time delay between transmission 210 of a resource request and return 218 of a resource grant. The measured time delay may be used as a first approximation of a required time delay (hold off time) for buffering audio from the requesting radio 170 until call connections can be set up with the members 172, 174 of the talk group.

In addition to timer A, a timer B 192, 194 may be activated within each of the participating zone controllers 116, 118. Timer B may be used to measure 212 a processing time of the resource request within the participating zone controller 116, 118.

As shown in FIG. 2, the timers B 192, 194 may be activated 214 by the participating zone controllers 116, 118 upon receipt of the resource request 210. Upon receipt of the resource request 210, the participating zone controllers 116, 118 may verify that a radio channel is available at each site 122 and 124 and transmit a call alert to the radios 172, 174.

Under alternative embodiments each Zone Controller time stamp each packet with its local time before sending. The receiving Zone Controller compares this time stamp with its local clock (provided the clocks are synchronized) to determine the one-way propagation time delay.

After checking to make sure it has sufficient resources for the call, the participating zone controllers 116, 118 may deactivate 216 the timer B and retrieve a measured time from timer B 192, 194. The participating zone controller 116, 118 may also compose a resource grant message incorporating the time value measured by timer B 192, 194 and send 218 the resource grant message back to the controlling zone controller 114.

Upon receipt of the resource grants, the controlling zone controller 114 may deactivate 220 the respective timers A 190 and determine a time interval measured by the respective timer A 190 for each participating zone controller 116, 118. The controlling zone controller 114 may also retrieve the processing time from timer B 192, 194 included within the resource grants 218.

In each case, the controlling zone controller 114 will calculate 221 a call connection time necessary to set up the call connection. In each case, a call connection time value is determined within an arithmetic unit 187 by subtracting an estimated message processing time of the participating zone controller 116, 118 from the time value provided by timer A 190 or by subtracting the actual time values measured by timer B 192, 194 (time value B) from the time value of timer A 190 (time value A).

The controlling zone controller 114 may determine 250 a buffering time for use with audio from the calling radio 170. Under one embodiment, the buffering time may be calculated as a function of the difference found by subtracting some constant time value "Q" from the measured time value A. Under another embodiment, the measured time value B may be subtracted from A to obtain an overall time delay measurement to be used to determine the buffering time.

Under other embodiments, even more sophisticated methods may be used. For example, in general, the set up time for a call connection for the calling radio 170 through a base site 120 of the controlling zone controller 114 has a relative constant time "Y" that is less than the time difference "A−B" (time value of A minus the time value of B) necessary for the set up of a call connection through a participating zone controller 116, 118. In order to determine a best overall buffering time, a largest relative difference is determined between the measured time to set up a call connection between the calling radio and the controlling zone controller (Y) and any called radio and the controlling zone controller (A−B) through any participating zone controllers. In this example, the time value of A−B−Y of participating zone controller 116 is compared within a comparator function 189 with the value of A−B−C of the second participating controller 118 and the largest is chosen as the buffering time.

In another embodiment, even more sophisticated methods may be used. For example, the largest value "Z" may be determined by solving the equation $Z=\text{Function}[\text{Max}(X_1+W_{max1}, X_2+W_{max2}, \ldots, X_n+W_{maxn})]$, where $X=A-B$ is the interzone delay between the controlling zone controller and the participating zone controller and $W_{maxn}$ is the maximum site delay for a participating zone controller "n" (discussed in more detail below).

The "Function" is a mathematical operator that incorporates the difference in transit time through a router between a resource request/grant and a JOIN message. For example, the processing time within a router of a resource request/grant is much faster than a JOIN message because of the additional processing time necessary to route a JOIN message. The "Function" operation may imply a constant multiplier (e.g., 1.1) or a multiplier based upon the number of routers that separates the controlling zone controller and each participating zone controller.

Once the resource grant is received from each of the participating zone controllers 116, 118, the controlling zone controller 114 will complete the call connection. To complete the call connection, the controlling zone controller 114 first selects a multicast group IP address for the call and associates the multicast address with a rendezvous point 196 within the core router 140 via a mapping function within the routers 128, 130, 134, 136, 138, 140, 142, 144, 146, 148, 150, 152. Configuration of the rendezvous point 196 may be understood by reference to RFC2362 available from the Network Working Group.

Once the multicast address has been selected, the controlling zone controller 114 may generate a call grant. The call grant may identify the call and IP address of the multicast group.

In the case of the called radios 172, 174, the controlling zone controller 114 may send 226 the call grant back to the IP source address of the resource grant (i.e., participating zone controllers 116, 118). Upon receiving the call grant, the participating zone controllers 116, 118 may select a channel available through the base site 122, 124 and forward 228 the channel grant and selected channel to the site controller 180, 182.

The site controller 180, 182 may send 230 an identifier of the selected channel to the called radio 172, 174 over a control channel. The site controller 180, 182 may also select a repeater 158, 162 and send 232 the channel grant and identifier of the selected channel to the selected repeater 158, 162. In response, the selected repeater 158, 164 may prepare to receive the audio packets by composing and sending 234 a JOIN message into the network 196. The JOIN message contains at least an IP address of the chosen repeater 158, 162. The JOIN message causes the IP address of the selected repeater 158, 162 to be added to a distribution tree within the network 196.

In the case of the calling radio 170, the controlling zone controller 114 may also select an available channel. Once a channel is selected, the controlling zone controller 114 may compose and send 236 a calling party set up message to the site controller 178 of the calling party 170. The caller set up message may include the call grant, the channel identifier and the value Z.

Within the site controller 178, the time value Z may be apportioned among the delay elements associated with sourcing audio. For example, the sourcing site link delay may be determined by the controlling zone controller by measuring the time of control messages exchanged between the site controller 178 and the controlling zone controller 114. In general, the sourcing site link delay "Y" may be determined 252 by one of these methods.

Figure 3:
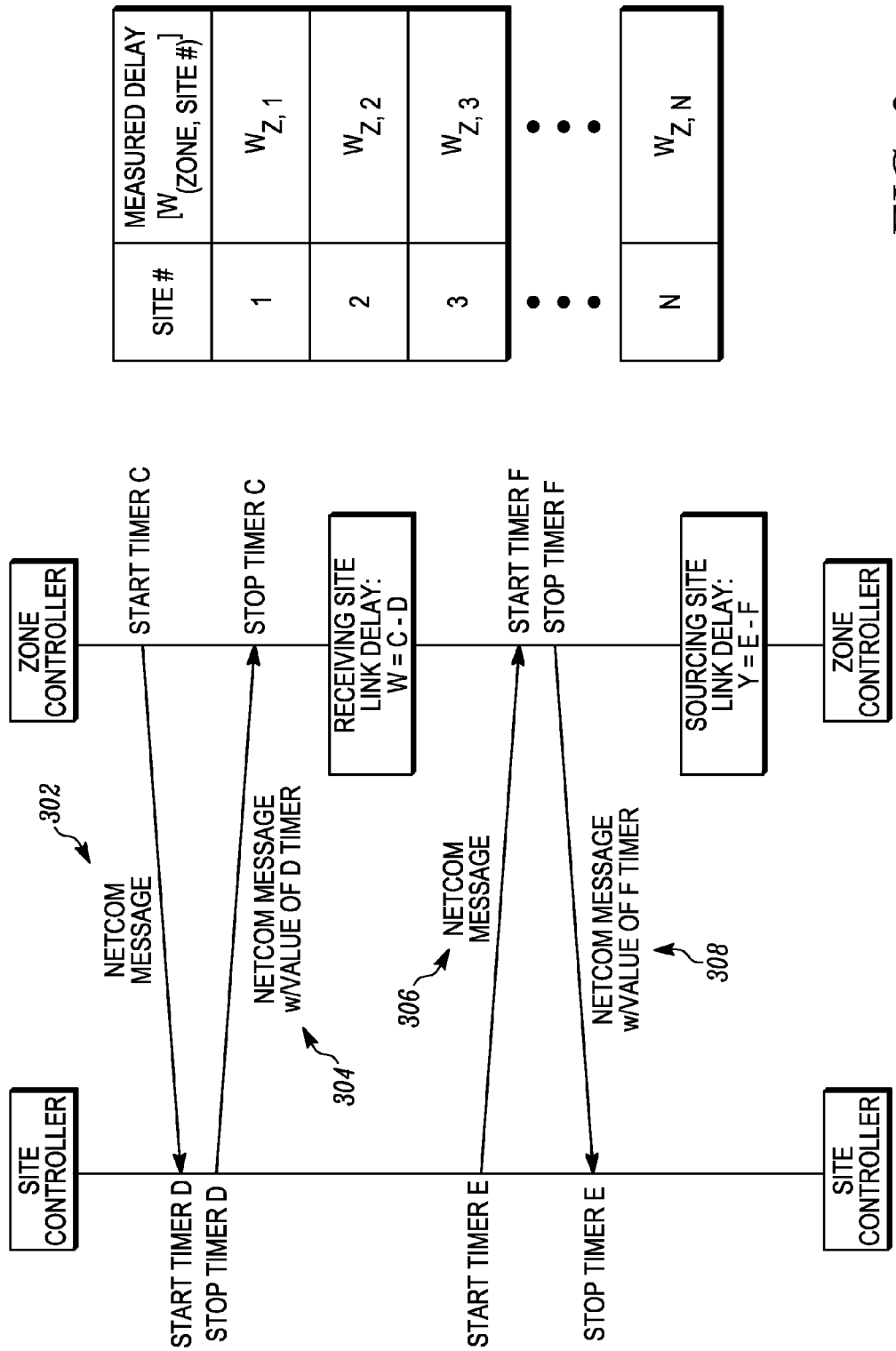
FIG. 3 is a signal flow chart that may be used by the system of FIG. 1 under an alternate embodiment.

For example, as shown in FIG. 3, the site controller 178 may query 306 the controlling zone controller 114 using a control message. To measure the delay, a timer (E) 179 is activated when the query is sent 306. Upon receipt of a response 308, the timer (E) is deactivated. A timer (F) 191 may be used to measure a processing time at the controlling zone controller 114. The measured processing time within the controlling zone controller 114 may be returned to the base site controller 178 along with the response to the control message. The processing time at the controlling zone controller 114 is subtracted from the delay between sending the control message and receiving the response to the control message.

Once the sourcing site link delay has been determined 252, a source hold off time may be determined 254 by subtracting the value Y from Z. The buffering time, in turn, may be determined 256 by subtracting the grant hold off time from the source hold off time. The grant hold off time may be chosen 258 as a time value (e.g., 0, 20 ms, etc.) during which a channel grant to the calling radio 170 may be intentionally delayed.

The site controller 178 may instruct 238 the calling radio 170 to tune to the available channel over a control channel. The site controller 178 may send 240 the channel grant and identifier of the selected channel to the selected repeater 154. The site controller 178 may program a buffer 198 and grant hold-off timer 199 (either within or coupled to) the repeater 154 to delay the grant to the subscriber and buffer the audio received over the selected channel for an amount of time equal to the buffering time. At the end of the buffer period, the repeater 154 begins to forward 244 audio information to the multicast address of the RP 196. Once the repeater 154 begins coupling audio to the RP 196, the RP 196 distributes 246 the audio to the IP addresses of the repeaters 158, 162 within the rendezvous point tree. The repeaters 158, 162, in turn, distribute 248 the audio to the radios 172, 174.

In another illustrated embodiment, each of the participating zone controllers 116, 118 and the controlling zone controller 114 measure a time delay associated with communicating with the base sites 120, 122, 124 and adjusts a buffering time accordingly. FIG. 3 depicts the process 300 of determining the time delay "W" of each base site.

Under the embodiment, the zone controllers 114, 116 118 may each periodically (e.g., every 15 minutes) measure a round-trip time delay of messages sent to each base site 120, 122, 124, 126 of the zone controller 114, 116, 118. In the case of the participating zone controllers 116, 118 in the example above, the largest of the round-trip delays is returned to the controlling base controller 114 as an additional delay value to be added to the value X. In the case of the controlling zone controller 114, the delay value of the base site 120 becomes a measure of the value Y.

As shown in FIG. 3, the zone controller 114, 116, 118, may query 302, 306 the base site 120, 122, 124 using a control message. To measure the delay, a timer 191 is activated when the query is sent 302. Upon receipt of a response 304, the timer is deactivated. A timer 179, 181, 183, 185 may be used to measure a processing time at each base site. The measured processing time within the base site 120, 122, 124, 126 may be returned to the zone controller 114, 116, 118 along with the response to the control message. As above, the processing time at the base site is subtracted from the delay between sending the control message and receiving the response to the control message. The overall difference time value of base site delay is entered into a table 306.

When a call is detected, the participating zone controllers 116, 118 returns a value of their own processing time B as well as a value W of the longest processing time of any base site involved in the call. The longest processing time may be determined by a comparator function 175, 177 189 within each zone controller 114, 116, 118 that compares the delay of each base site involved in a call to determine the longest time delay. The join delay would be determined by the equation Delay=A−B+W−Y. To determine the overall buffering delay of audio information in this embodiment, the delay measured between the sending site (audio source) and the Controlling Zone Controller should be subtracted from the join delay.

Figure 4:
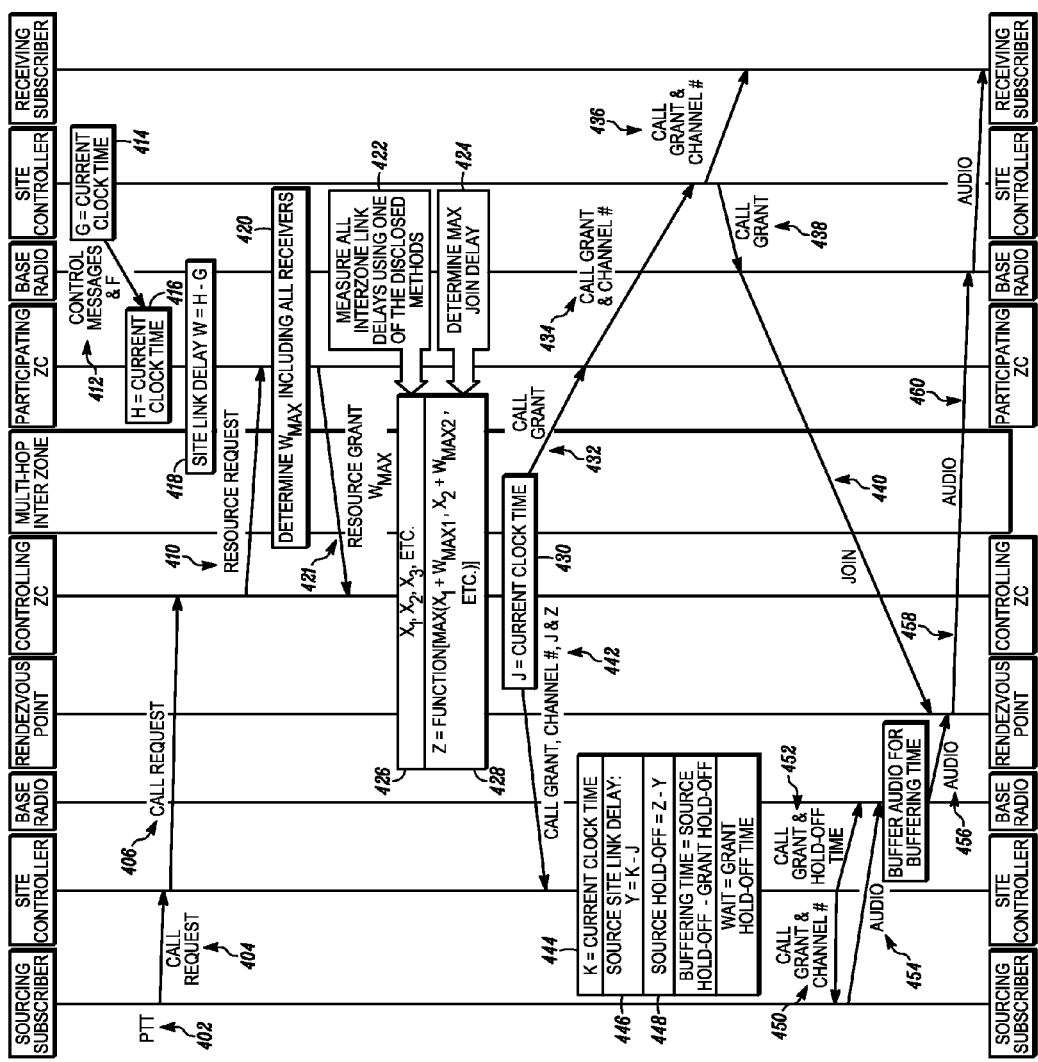
FIG. 4 is a signal flow chart that may be used by the system of FIG. 1 under still another alternate embodiment.

Under the embodiment of FIG. 4 the Zone Controller and Site Controllers to maintain synchronized clocks (i.e. using the Network Time Protocol). Each controller includes a time stamp in all control messages which the receiving controller can use to determine the propagation delay of the site link by subtracting the time the message was received from the time included in the message. In this case, the activation 402 of the PTT, transfer 404 of the call request to the site controller and transfer 406 of the call request from the site controller to the controlling zone controller 114 occurs substantially the same as steps 202, 204 and 206 described in conjunction with FIG. 2. Similarly, the resource grant 410 from the controlling zone controller 114 to the participating zone controller 116, 118 occur in a manner similar to step 210 of FIG. 2.

Within the participating zone controller, control messages exchanged 412 with the site controllers may occur in a manner similar to the exchanged messages 302, 304 described in conjunction with FIG. 3. One difference is that the control message 412 returned to the participating zone controller is time stamped 414 with a time value "A". Within the participating zone controller, a current time "B" is retrieved 416 and compared 418 to determine a delay for the site controller.

Once a delay is determined 418 for each site controller of the participating base site, a maximum site delay $W_{max}$ is determined 420 among all the site controllers associated with the participating zone controller 116, 118. The participating zone controller 116, 118 may then compose a resource grant 421 that includes the maximum site delay $W_{max}$. The resource grant 421 is also time stamped 416 with a time L.

Within the controlling zone controller 114, the time stamp L is subtracted from a current time M to determine an inter zone delay. The controlling zone controller 114 may measure 422 all the inter zone delays X for each participating zone controller using one of the previously described methods, as discussed above.

The inter zone delays X may be accumulated 426 and a maximum JOIN delay determined 424 from the delays X and $W_{max}$. A function Z may be calculated 428 that incorporates the maximum measured delays.

In the case of the called radios 172, 174, the controlling zone controller 114 may send 432 the call grant back to the IP source address of the resource grant (i.e., participating zone controllers 116, 118). Upon receiving the call grant, the participating zone controllers 116, 118 may select a channel available through the base site 122, 124 and forward 434 the channel grant and selected channel to the site controller 180, 182.

The site controller 180, 182 may send 436 an identifier of the selected channel to the called radio 172, 174 over a control channel. The site controller 180, 182 may also select a repeater 158, 162 and send 438 the channel grant and identifier of the selected channel to the selected repeater 158, 162. In response, the selected repeater 158, 164 may prepare to receive the audio packets by composing and sending 440 a JOIN message into the network 196. The JOIN message contains at least an IP address of the chosen repeater 158, 162. The JOIN message causes the IP address of the selected repeater 158, 162 to be added to a distribution tree within the network 196.

In the case of the calling radio 170, the controlling zone controller 114 may also select an available channel. Once a channel is selected, the controlling zone controller 114 may compose and send 442 a calling party set up message to the site controller 178 of the calling party 170. The caller set up message may include the call grant, the channel identifier, the value Z and a time stamp 430 with a time value J.

Within the site controller 178, the time value Z may be apportioned as described above among the delay elements associated with sourcing audio. The source hold off delay may be determined by retrieving 444 a current time K and subtracting 446 the time stamp J from a current time K.

The buffering time, in turn, may be determined 448 by subtracting the grant hold off time from the source hold off time. As above, the grant hold off time may be chosen as a time value (e.g., 0, 20 ms, etc.) during which a channel grant to the calling radio 170 may be intentionally delayed.

The site controller 178 may instruct 450 the calling radio 170 to tune to the available channel over a control channel. The site controller 178 may send 452 the channel grant and identifier of the selected channel to the selected repeater 154. The site controller 178 may program a buffer 198 and grant hold-off timer 199 (either within or coupled to) the repeater 154 to delay the grant to the subscriber and buffer the audio received over the selected channel for an amount of time equal to the buffering time. At the end of the buffer period, the repeater 154 begins to forward 456 audio information to the multicast address of the RP 196. Once the repeater 154 begins coupling audio to the RP 196, the RP 196 distributes 458 the audio to the IP addresses of the repeaters 158, 162 within the rendezvous point tree. The repeaters 158, 162, in turn, distribute 460 the audio to the radios 172, 174.

Specific embodiments of methods and apparatus for reducing audio truncation have been described for the purpose of illustrating the manner in which one possible alternative of the invention is made and used. It should be understood that the implementation of other variations and modifications of embodiments of the invention and its various aspects will be apparent to one skilled in the art, and that the various alternative embodiments of the invention are not limited by the specific embodiments described. Therefore, it is contemplated to cover all possible alternative embodiments of the invention and any and all modifications, variations, or equivalents that fall within the true spirit and scope of the basic underlying principles disclosed and claimed herein.

The invention claimed is:

1. A method of reducing truncation of time critical information in a trunked radio system having a plurality of zone controllers comprising:
   receiving a call request from a calling radio by a controlling zone controller of the plurality of zone controllers;
   responsive to receiving the call request, measuring a time necessary to set up a call connection between the controlling zone controller and a plurality of called radios and/or wireline consoles where the call connections of the plurality of called radios and/or wireline consoles are each set up through a different respective participating zone controller of the plurality of zone controllers;

determining a largest relative measured time among the measured times to set up the call connection; and buffering time critical information from the calling radio for a time period equal to the determined largest relative time.

2. The method of reducing truncation as in claim 1 wherein the step of measuring the time further comprises activating a timer when a resource request is sent to each participating zone controller and deactivating the timer when a resource grant is received from the participating zone controller or comparing a time stamp of a resource grant from the participating zone controller with a current time of the controlling zone controller.

3. The method of reducing truncation as in claim 2 further comprising returning a time value for processing the resource request from the participating zone controller to the controlling zone controller along with the resource grant.

4. The method of reducing truncation as in claim 3 further comprising subtracting the processing time from the measured time to obtain a message delay time for the participating zone controller.

5. The method of reducing truncation as in claim 4 further comprising the participating zone controller measuring a round-trip or one-way time delay for messages sent between the participating zone controller and each base site served by the participating zone controller.

6. The method of reducing truncation as in claim 5 wherein the step of measuring the time delay further comprises sending a control message to the base site and the base site returning a response to the control message along with a time for processing the control message to the participating zone controller.

7. The method of reducing truncation as in claim 6 further comprising the participating zone controller determining a maximum measured time delay for each base site of the participating zone controller and sending the maximum base site time delay to the controlling zone controller along with the resource grant message.

8. The method of reducing truncation as in claim 7 further comprising the controlling zone controller adding the maximum base site delay time to the buffering time period.

9. The method of reducing truncation as in claim 5 wherein the step of measuring the time further comprises comparing a time stamp of a control message with a current time.

10. An apparatus for reducing truncation of time critical information in a trunked radio system having a plurality of zone controllers comprising:

a call request from a calling radio or wireline console to a controlling zone controller of the plurality of zone controllers;

a timer that, responsive to the call request, measures a time necessary to set up a call connection between the controlling zone controller and a plurality of called radios and wireline consoles where the call connections of the plurality of called radios and wireline consoles are each set up through a different participating zone controller of the plurality of zone controllers;

a comparator function that determines a largest relative measured time among the measured times to set up the call connection; and a buffer that buffers time critical information from the calling radio for a time period proportional to the determined largest relative time minus the source delay (between sourcing radio or wireline console and the zone controller) and any Grant Hold-off time.

11. The apparatus for reducing truncation as in claim 10 further comprising a resource request that activates the timer when the resource request is sent to each participating zone controller and a resource grant that deactivates the timer when the resource grant is received from the participating zone controller.

12. The apparatus for reducing truncation as in claim 11 further comprising a time value for processing the resource request that is returned from the participating zone controller to the controlling zone controller along with the resource grant.

13. The apparatus for reducing truncation as in claim 12 further comprising an arithmetic unit that subtracts the processing time from the measured time to obtain a message delay time for the participating zone controller.

14. The apparatus for reducing truncation as in claim 13 further comprising a timer within the participating zone controller that measures a round-trip or one-way time delay for messages sent between the participating zone controller and each base site served by the participating zone controller.

15. The apparatus for reducing truncation as in claim 14 further comprises a control message that is sent to the base site and returned along with a time for processing the control message to the participating zone controller.

16. The apparatus for reducing truncation as in claim 15 further comprising a comparator function within the participating zone controller that determines a maximum measured time delay for each base site of the participating zone controller.

17. The apparatus for reducing truncation as in claim 16 further comprising the participating zone controller incorporating the maximum base site time delay into the resource grant message sent to the controlling zone controller.

18. An apparatus for reducing truncation of time critical information in a trunked radio system having a plurality of zone controllers comprising:

a controlling zone controller of the plurality of zone controllers that receives a call request from a calling radio;

a timer that, responsive to the call request, measures a time necessary to set up a call connection between the controlling zone controller and each participating zone controller of the plurality of zone controllers where the participating zone controller serves either the calling radio or wireline console, or any called radio or wireline console;

a comparator function that determines a largest relative difference between the measured time necessary to set up the call connection between the calling radio or wireline console and the controlling zone controller and any called radio or wireline console and the controlling zone controller; and a buffer that buffers time critical information from the calling radio for a time period proportional to the determined largest relative time difference.

19. The apparatus for reducing truncation as in claim 18 further comprising activating the timer that is activated upon requesting a resource grant from each participating zone controller and deactivated upon receiving the resource grant.

* * * * *